United States Patent
Ivanchenko

(10) Patent No.: US 9,589,327 B2
(45) Date of Patent: Mar. 7, 2017

(54) APPARATUS AND METHOD FOR NOISE REDUCTION IN DEPTH IMAGES DURING OBJECT SEGMENTATION

(71) Applicant: Samsung Electronics Co., Ltd., Suwon-si, Gyeonggi-do (KR)

(72) Inventor: Volodymyr Ivanchenko, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/735,856

(22) Filed: Jun. 10, 2015

(65) Prior Publication Data

US 2016/0364844 A1  Dec. 15, 2016

(51) Int. Cl.

| | |
|---|---|
| *G06K 9/34* | (2006.01) |
| *G06K 9/40* | (2006.01) |
| *G06T 5/00* | (2006.01) |
| *G06T 7/00* | (2006.01) |
| *G06T 15/08* | (2011.01) |
| *G06T 3/60* | (2006.01) |

(52) U.S. Cl.
CPC .............. *G06T 5/002* (2013.01); *G06T 3/60* (2013.01); *G06T 7/0075* (2013.01); *G06T 7/0079* (2013.01); *G06T 15/08* (2013.01); *G06T 2207/10012* (2013.01); *G06T 2207/20148* (2013.01)

(58) Field of Classification Search
CPC ...... G06K 9/6256; G06K 9/66; G06K 9/6217; G06K 9/6282; G06F 17/30256; G06T 5/002; G06T 7/0075; G06T 15/08; G06T 7/0079; G06T 3/60; G06T 2207/20148; G06T 2207/10012
USPC ....... 382/100, 154, 164, 162, 168, 173, 181, 382/190, 199, 195, 254, 232, 276, 305, 382/285, 275; 345/209, 418, 419; 715/757, 852

See application file for complete search history.

(56) References Cited

U.S. PATENT DOCUMENTS

| | | | | |
|---|---|---|---|---|
| 8,917,954 | B2* | 12/2014 | Kim ................... | H04N 13/0022 382/154 |
| 9,208,541 | B2* | 12/2015 | Kim ........................ | G06T 5/50 |
| 9,311,901 | B2* | 4/2016 | Webster ................ | G09G 5/377 |
| 2013/0129192 | A1* | 5/2013 | Wang .................. | H04N 13/0011 382/154 |
| 2013/0243314 | A1* | 9/2013 | Civit ..................... | G06T 7/0081 382/164 |

* cited by examiner

*Primary Examiner* — Sheela C Chawan
(74) *Attorney, Agent, or Firm* — Jefferson IP Law, LLP

(57) ABSTRACT

An apparatus and method for reducing noise in a depth image are provided. The method includes capturing an image, generating a depth map of the image, the depth map including depth information corresponding to at least one object included in the image, performing over-segmentation of the depth map to generate segmentation information corresponding to the image, determining at least one segment to be noise according to the over-segmentation, and deleting the segment determined to be noise.

18 Claims, 8 Drawing Sheets

APPARATUS AND METHOD FOR NOISE REDUCTION IN DEPTH IMAGES DURING OBJECT SEGMENTATION

TECHNICAL FIELD

The present disclosure relates to an apparatus and method for reducing noise in depth images. More particularly, the present disclosure relates to an apparatus and method for reducing noise in depth images during an object segmentation operation performed on the depth image.

BACKGROUND

Mobile terminals, which may include any portable and/or mobile electronic device, are currently being developed to provide wireless communication between users. As technology has advanced, mobile terminals now provide many additional features beyond simple telecommunications and voice services. For example, mobile terminals may now provide additional features and services, such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, mobile terminals have become widely used in daily life.

For example, mobile terminals provide an image capturing function, which may include capturing at least one of a 2 Dimensional (2D) image, a 3 Dimensional (3D) image, a video and/or moving image, a still image derived from the video and/or moving, an image derived from sensors and/or sensor data, and/or a multimedia image. The mobile terminals may include a depth sensor in order to detect a depth of an object included in a captured image. Accordingly, the depth sensor may measure a distance to an object in order to provide distance information in addition to standard color information to be included in image data. For example, by augmenting a Joint Pictures Expert Group (JPEG) file format by approximately 30%, depth information may be added to color images. Thus, depth information may be used in a wide variety of applications, such as searching of 3D images, searching of 3D information, creating and/or printing object models, and any other similar and/or suitable application using depth information.

Currently, related art research in improving a performance of depth sensors has been directed towards filtering Gaussian noise, such as thermal noise, "salt and pepper" noise, and any other similar form of noise that may be classified as Gaussian noise, from a 3D image generated according to the depth sensor. In order to remove the Gaussian noise from a 3D image, image denoising methods, which include methods to remove noise from an image, may be used. The image denoising methods of the related art may include averaging, determining a median, and any other similar and/or suitable image denoising methods. However the main effect of applying a filter to reduce Gaussian noise in the related art is additional blur in the case of averaging or blurring of low spatial frequencies in the case of a median filter. Moreover, averaging pixels in a depth map would lead to virtually connecting separate objects during 3D reconstruction and thus is prohibitive.

In the case of a depth sensor, the noise may be classified as non-Gaussian noise, which may also be referred to as "blob-like" noise. Additionally, related-art techniques for determining whether there is noise, and such as taking a derivative of a depth signal generated by a depth sensor, may not consider spatial distribution of noise and/or spatial distribution of object depths. Furthermore, if depth information is contaminated with just a few noisy pixels, then information corresponding to a size and shape of objects sensed by a depth sensor may be significantly distorted. Many depth sensors share the same noise problems due to incorrect matching of stereo images, occlusions, lens distortions, etc. Accordingly, there is a need for an apparatus and method providing an improved method for reducing noise in depth images.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for reducing noise in depth images.

In accordance with an aspect of the present disclosure, a method for reducing noise in a depth image is provided. The method includes capturing an image, generating a depth map of the image, the depth map including depth information corresponding to at least one object included in the image, performing over-segmentation of the depth map to generate segmentation information corresponding to the image, determining at least one segment to be noise according to the over-segmentation, and deleting the segment determined to be noise.

In accordance with another aspect of the present disclosure, an apparatus for reducing noise in a depth image is provided. The apparatus includes a camera configured to capture an image, a depth sensor configured to determine depth information, wherein the depth information corresponds to at least one object in the image, and a controller configured to generate a depth map of the image according to the depth information, to perform over-segmentation of the depth map to generate segmentation information corresponding to the image, to determine at least one segment to be noise according to the over-segmentation, and to delete the segment determined to be noise.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure are provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Various embodiments of the present disclosure include an apparatus and method for reducing noise in depth images.

Figure 1:
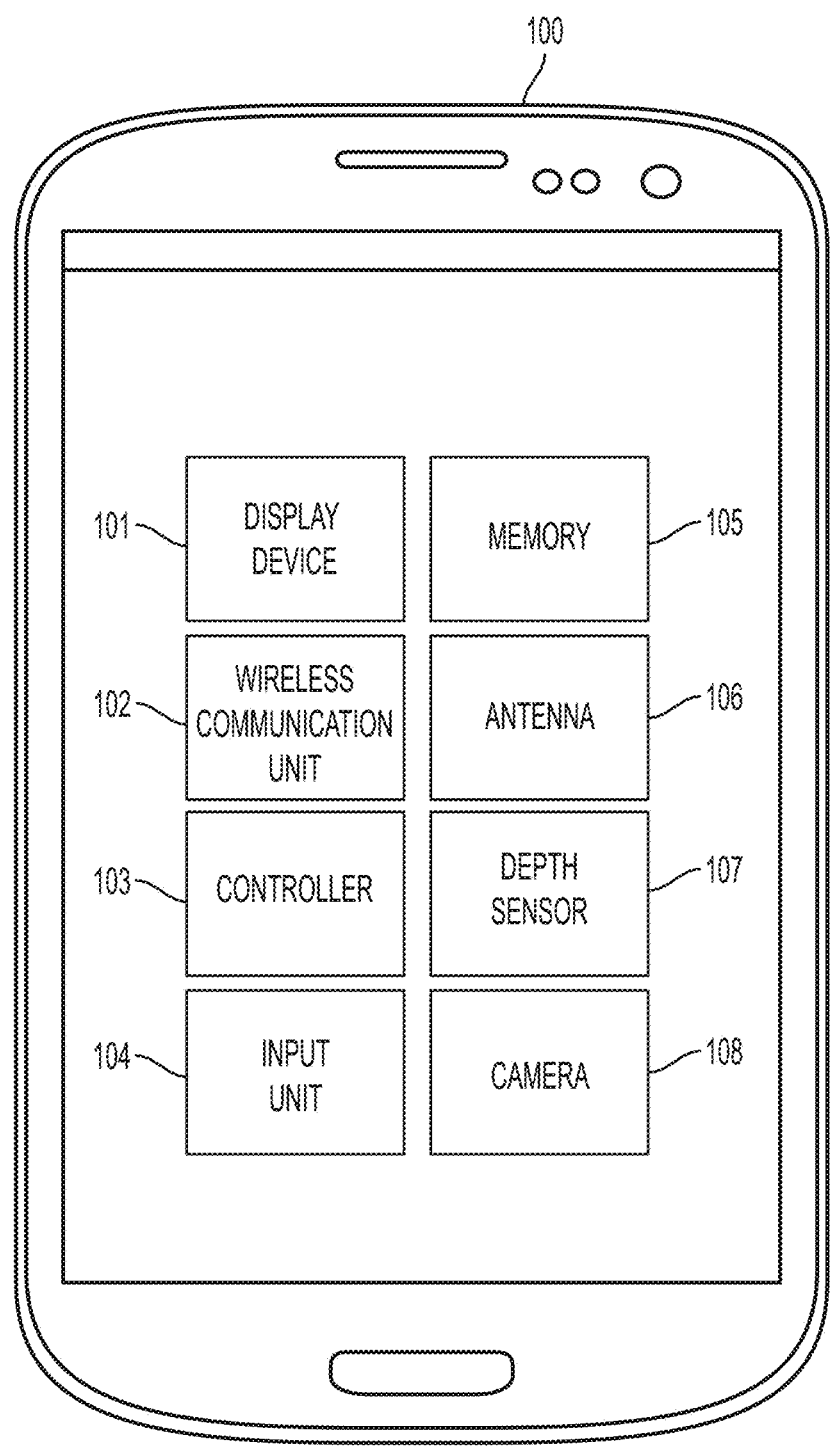
FIG. 1 is an electronic device according to an embodiment of the present disclosure.

FIG. 1 is an electronic device according to an embodiment of the present disclosure.

Referring to FIG. 1, an electronic device 100 provides noise reduced depth images during object segmentation. In other words, the electronic device 100 may be a mobile terminal, a smartphone, a cellphone, a Personal Computer (PC), a laptop PC, a tablet PC, a camera, a peripheral sensor, a portable electronic device, an any other similar and/or suitable electronic device. The electronic device 100 may include a display device 101, a wireless communication unit 102, a controller 103, an input unit 104, a memory 105, an antenna 106, a depth sensor 107, and a camera 108. The electronic device 100 may be, for example, a part or the entire electronic device 700 of FIG. 7 or the electronic device of FIG. 8.

The display device 101 may display information for a user of the electronic device 100, such as a variety of screens, multimedia content, graphics, and other information. The display unit may be a Liquid Crystal Display (LCD) device, a Light Emitting Diode (LED) display device, an Organic LED (OLED) display device, an Active Matrix OLED (AMOLED) display device, a Thin Film Transistor (TFT) display device, or any other similar and/or suitable display device for displaying information. The display device 101 may be a touch sensitive device that may receive a user input inputted according to a gesture, such as a touch gesture. Accordingly, the display device 101 may include a touch sensitive device, such as a capacitance type and/or resistance type touch input device.

The wireless communication unit 102 may be configured to transmit and/or receive wireless radio communication signals, such as Radio Frequency (RF) signals and may include other radio communication elements that are not shown in FIG. 1, such as a Digital-to-Analog Converter (DAC) configured to convert digital signals to analog signals and to convert analog signals to digital signals, a transmitter configured to transmit signals, a receiver configured to receive signals, a modem configured to modulate and demodulate signals transmitted and/or received by the transmitter and/or receiver, and any other similar and/or suitable elements used for radio communications with a wireless network and/or other radio communication devices, such as other portable terminals, transmitting and/or receiving radio communication signals. Furthermore, the wireless communication unit 102 may be a Multi-Input Multi-Output (MIMO) device and may include more than one antenna. The wireless communication unit 102 may be configured to transmit and/or receive the wireless radio communication signals via the antenna 106. Furthermore, the wireless communication unit 102 and the antenna 106 may not be included in the electronic device 100 in a case where the electronic device 100 does not perform wireless communication features. According to another embodiment of the disclosure, a wired communication unit (not shown) may be included in the electronic device 100 to perform data communication using a wired connection.

The controller 103 may be configured to control overall operations of the electronic device 100. The controller 103 may control all other elements of the electronic device 100, including, but not limited to, the display device 101, the wireless communication unit 102, the controller 103, the input unit 104, the memory 105, the antenna 106, the depth sensor 107, and any other elements, units, and/or devices included in and/or connected to the electronic device 100. For example, the controller may control operations of a presence confirmation method of the embodiment of the present disclosure. The controller 103 may be any suitable hardware apparatus and/or element, such as a processor, a computer chip, an Integrated Circuit (IC), an Application Specific IC (ASIC), Electronically Programmable Read Only Memory (EPROM), or any other similar and/or suitable hardware apparatus and/or element.

The input unit 104 may be configured to receive a user's input for executing operations of and to input information to the electronic device 100. The input unit 104 may be a keyboard, a button, a touch input device such as a touch screen, a touch pad, or any other similar and/or suitable touch input device and/or input device. Furthermore, although not shown in the electronic device 100, the display device 101 and the input unit 104 may be formed as one unit for displaying information and receiving the user's input, such that the electronic device 100 is a touch screen device including a touch screen unit and a display device.

The memory 105 may be configured to store data used and generated by the user of the electronic device 100 and may also store applications, a phonebook, multimedia contents, operations and executable commands, and any other data and/or information used in or generated by the operation of the electronic device 100 and/or the operation of the controller 103. For example, the memory 105, according to the embodiment of the present disclosure, may include and/or store a contact list, which may include a list of family, friends, professional contacts and/or associates, classmates, drinking buddies, community members, persons following a user and/or a user account, and persons and or public identities followed by a user, or any other similar and/or suitable group of persons known to and/or associated with the user of the mobile terminal and/or a public identity that may be managed through the mobile terminal.

The depth sensor 107 may be an infrared sensor, a capacitance type sensor, a Doppler effect sensor, a laser rangefinder, a photovoltaic sensor, a Charge Coupled Device (CCD), an image sensor, a magnetic sensor, a radar, a photocell, a sonar sensor, an ultrasonic sensor, an ultra-wideband sensor, or any other similar and/or suitable type of sensor for sensing a distance of an object. The depth sensor 107 may determine a distance to an object, relative to a location of the depth sensor 107. For example, according to an embodiment, the depth sensor 107 may determine a distance between the depth sensor 107 or the electronic device 100 and an object external to the electronic device 100. The depth sensor 107 determine the distance, which may also be referred to as distance information, according to sensory data and may provide the distance information to other elements of the electronic device 100, and may save and/or store the distance information in the memory 105. Thus, the depth sensor 107 may be used to generate a 3 Dimensional (3D) map.

The camera 108 may be used to capture an image, such as a photograph, a still image, a moving image, an infrared image, or any other similar and/or suitable type of graphical information that may be captured with a camera 108. The camera 108 may be a Charge Coupled Device (CCD) camera, a Complementary Metal Oxide Semiconductor (CMOS) camera, a Single Lens Reflex (SLR) camera, an Active Pixel Sensor (APS) camera, or any other similar and/or suitable type of image sensor and/or camera. The camera 108 and the depth sensor 107 may operate in conjunction such that when the camera 108 is activated and/or operated in order to capture an image, the depth sensor 107 is also activated and/or operated. Accordingly, the depth sensor 107 may capture depth information corresponding to an image captured by the camera 108. Respective depth information may be stored so as to correspond to a respective captured image.

Figure 2:
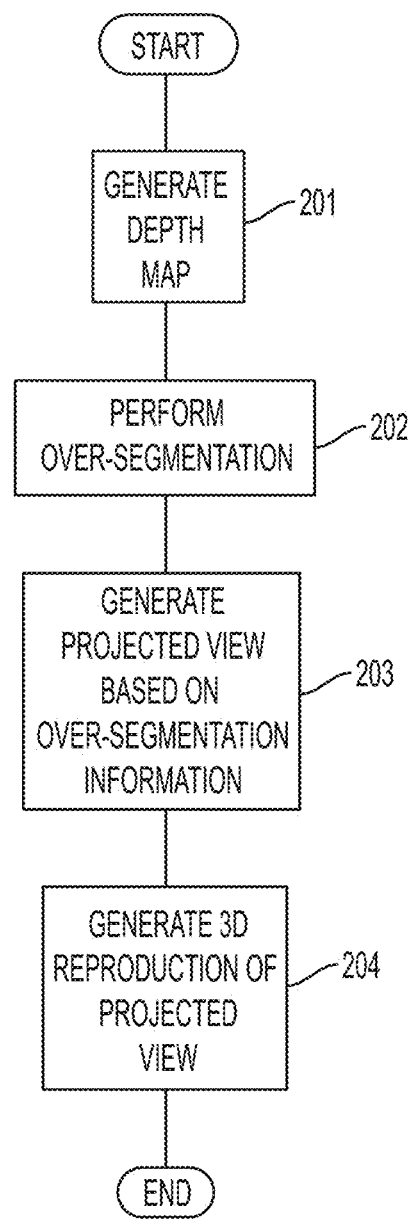
FIG. 2 illustrates a flowchart of a method for reducing noise in depth images during an object segmentation operation performed on the depth image according to an embodiment of the present disclosure.

FIG. 2 illustrates a flowchart of a method for reducing noise in depth images during an object segmentation operation performed on the depth image according to an embodiment of the present disclosure.

Referring to FIG. 2, the electronic device 100 generates a depth map in operation 201. A depth map resembles a regular image, but instead of grey or color pixels the depth map has levels of disparity. Disparity is equal to a shift between features in the left and right stereo images. Disparity is also related to the depth or distance along the z-axis via the formula $z=f*B/D$, where z is distance, f is focal length, B is a baseline between two cameras (horizontal shift), and D is the disparity. The depth map may be generated according to the depth information generated and or collected by the depth sensor 107. For example, when a user of the electronic device 100 captures an image using the camera 108, the depth sensor may capture depth information of at least one object and/or item included in the image captured by the camera 108. The depth information may be a distance to the at least one object or may be any other similar and/or suitable information that conveys 3D information about the at least one object. Additionally, the depth map may be smoothed and the depth map may be converted into world coordinates corresponding to an entirety of the captured image so that the at least one object and/or item are mapped relative to each other.

The depth map is typically generated by running a stereo correspondence algorithm on a pair of stereo images. Other methods include time of flight sensors, plenoptic and structured light cameras.

Next, in operation 202, the electronic device 100 performs over-segmentation of the depth map information according to analysis of the generated depth map. For example, the electronic device 100 may generate segmentation information of the generated depth map. More specifically, according to an embodiment of the disclosure, the electronic device 100 may generate over-segmentation information according to a Connected Component (CC) algorithm. However, the present disclosure is not limited thereto, and the over-segmentation information may be generated according to any suitable method, algorithm, and/or process.

In further detail, the CC algorithm may include a depth smoothness threshold. A depth smoothness threshold describes a maximum depth variation that can be attributed to an object, as opposed to the separate objects. If a depth threshold is too small then the noise cleaning will not be performed for objects that have significant depth variations. If the smoothing threshold is too large, then a depth map will incorrectly connect separate objects together that are located in close proximity in the depth map (but not necessarily in 3D). According to an embodiment of the present disclosure, the depth smoothness threshold may be set low such that many segments are generated, and the small segments are likely to correspond to and/or represent noise.

Furthermore, segments may be compared to a noise size threshold, which is a threshold corresponding to a size of a segment. According to an embodiment, segments of the depth map that have a size less than and/or equal to a noise size threshold may be deleted. However, the present disclosure is not limited thereto, and the noise size threshold may be an upper limit or a lower limit corresponding to the deleting of segments determined to be noise.

The over-segmentation may be performed by a connected component algorithm of the related art. The algorithm finds connected regions in a binary image and marks them with unique labels. Over-segmentation as the term is used herein means that initially more segments are extracted than are actually present. The main idea is to separate object parts as much as possible with the following merging procedure that restores larger segments out of smaller ones.

Next, in operation 203, the electronic device 100 generates a projected view corresponding to the depth map, wherein the projected view is determined according to the over-segmentation information. In further detail, the electronic device 100 may generate information corresponding to at least one projected view of the image captured by the camera 108 and/or corresponding to at least one object included in the image captured by the camera 108. Furthermore, the electronic device 100 may generate more than one projected view, and each of the more than one projected view may be a different projected view of the image captured by the camera 108 and/or may each be corresponding to a different one of the at least one object included in the image captured by the camera 108.

The projected view may be a 3D reconstruction of the visual scene where a virtual camera or a viewpoint is put at a desired location. Since 3D information about the scene is known, the scene can be arbitrary rotated and translated before taking another shot with a "virtual camera" making another projected view.

In operation 204, the electronic device 100 generates a 3D reconstruction of the projected top view. The 3D reconstruction may be generated using the segmentation information from which the noise has been removed. Accordingly, the 3D reconstruction, generated according to the present disclosure, includes less noise and thus, provides a better 3D representation of the at least one object and/or item included in the image captured by the camera 108.

The 3D reconstruction of the projected view may be generated, for example, by using pin-hole camera equations of the related art.

Figure 3A:
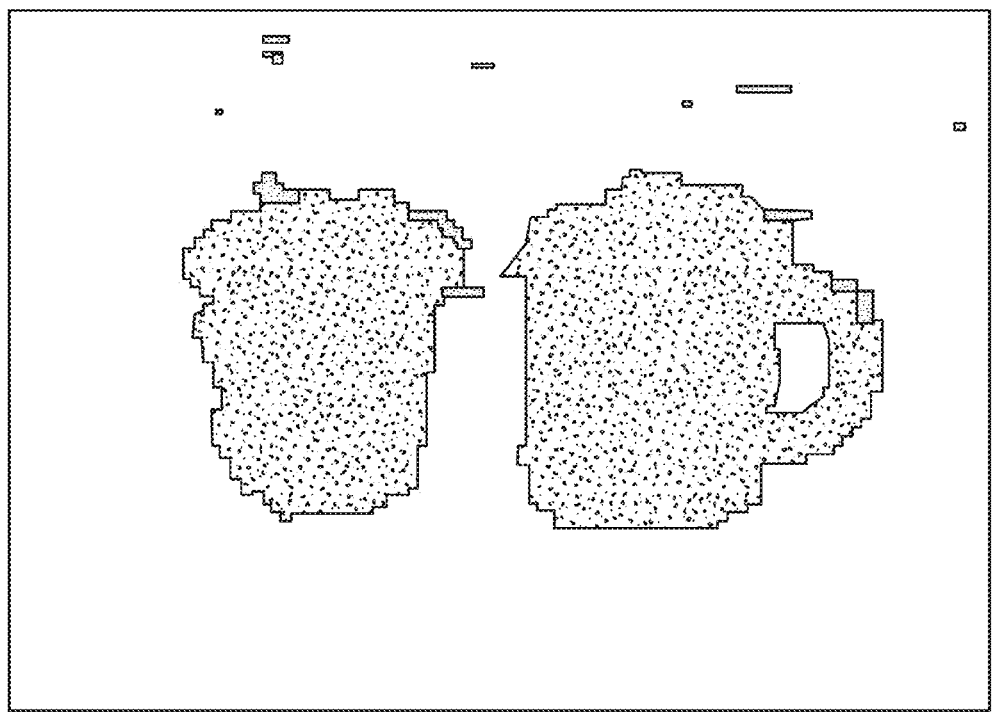
FIGS. 3A and 3B illustrate over-segmentation according to an embodiment of the present disclosure.
Figure 3B:
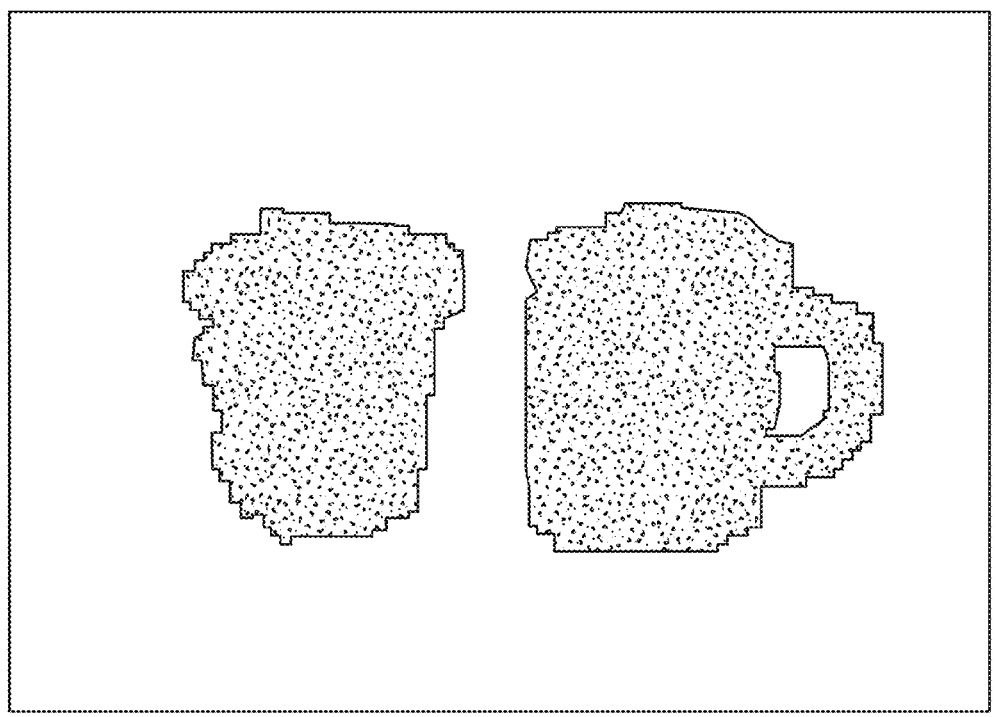

FIGS. 3A and 3B illustrate over-segmentation according to an embodiment of the present disclosure.

Referring to FIGS. 3A and 3B, FIG. 3A is an image of a cup and a mug, wherein over-segmentation of the image has been performed in order to identify the noise included in the image. FIG. 3B illustrates the image of the cup and the mug, wherein the noise has been removed from the over-segmented image shown in FIG. 3A.

Figure 4A:
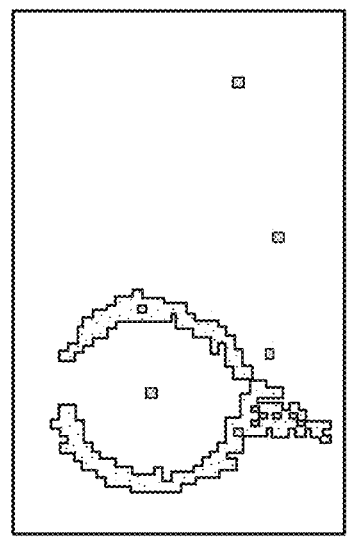
FIGS. 4A and 4B illustrate top view of an object according to an embodiment of the present disclosure.
Figure 4B:
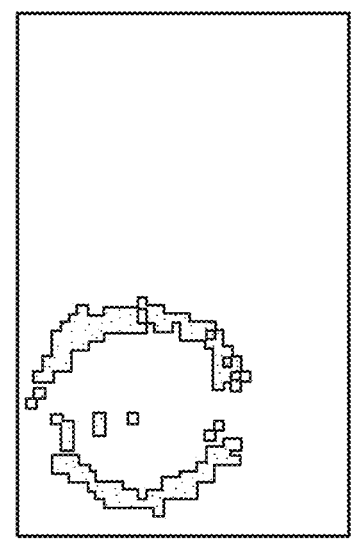

FIGS. 4A and 4B illustrate top views of an object according to an embodiment of the present disclosure.

Referring to FIGS. 4A and 4B, FIG. 4A is a top view of a mug (e.g., the mug of FIGS. 3A and 3B), wherein over-segmentation of the image has been performed in order to identify the noise included in the image. FIG. 4B illustrates the top view of the mug, wherein the noise has been removed from the over-segmented image shown in FIG. 4A.

Figure 5A:
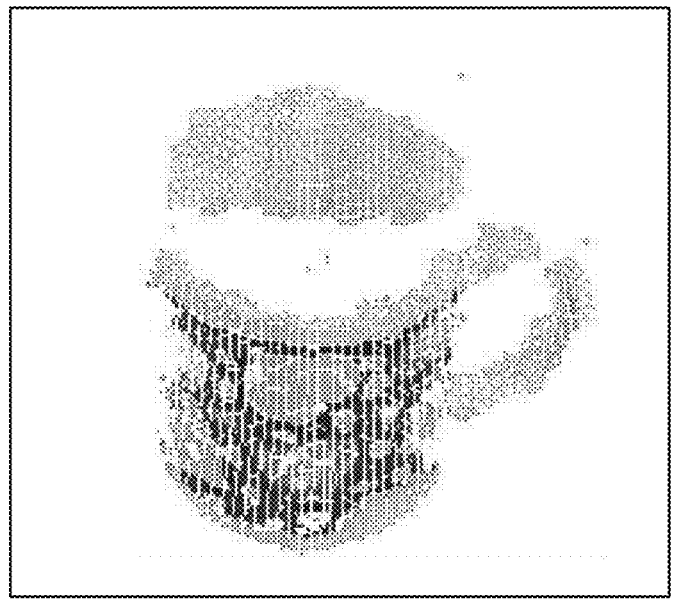
FIGS. 5A and 5B illustrate a 3 Dimensional (3D) reconstruction of an object according to an embodiment of the present disclosure.
Figure 5B:
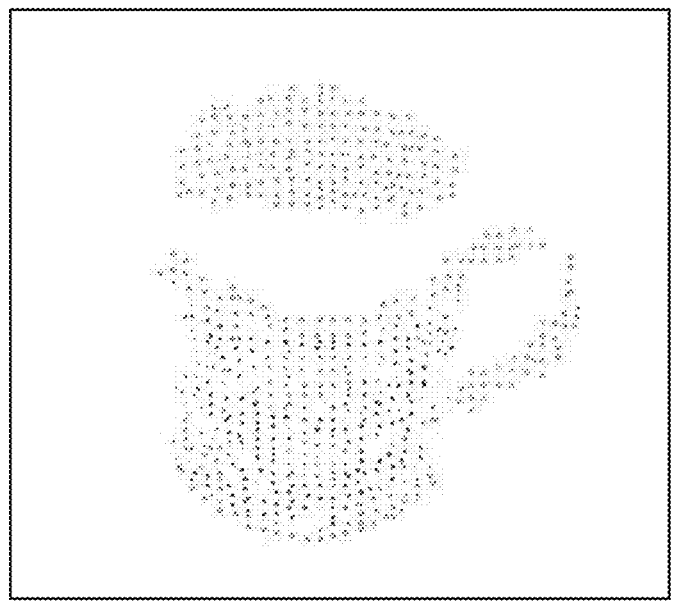

FIGS. 5A and 5B illustrate a 3D reconstruction of an object according to an embodiment of the present disclosure.

Referring to FIGS. 5A and 5B, FIG. 5A illustrates a 3D reconstruction of a mug (e.g., the mug of FIGS. 4A and 4B), wherein small and/or isolated voxels represent noise included in the 3D reconstruction. FIG. 5B illustrates another 3D reconstruction of the mug, wherein the noise has been removed and a point cloud was uniformly voxelized. Voxelization of the point cloud is similar to the process of sub-sampling the image, but in 3D. Originally one can represent an object with, for example, a thousand voxels (pixels in 3D) and an unnecessary level of details. Since the objects are typically smooth in 3D, one can average and sub-sample an original point cloud resulting in a smaller number of voxels per object.

Figure 6:
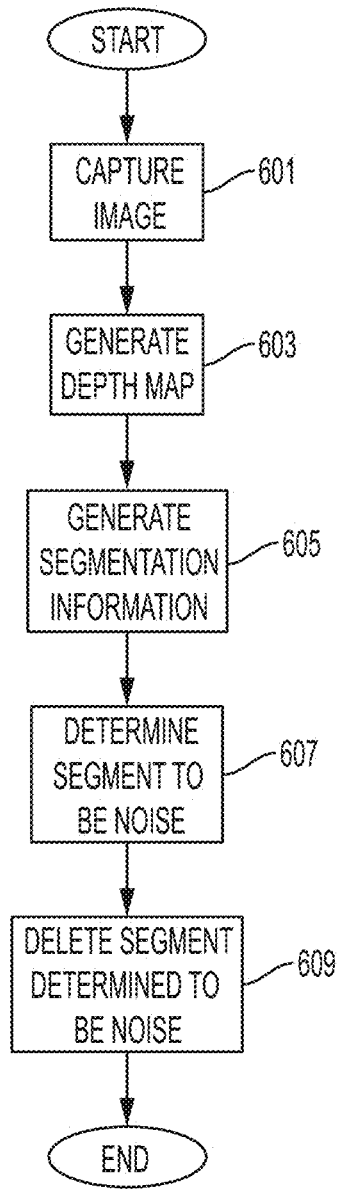
FIG. 6 illustrates a flowchart of a method according to an embodiment of the present disclosure.

FIG. 6 illustrates a flowchart of a method according to an embodiment of the present disclosure.

Referring now to FIG. 6, the electronic device 100 captures an image is at operation 601. At operation 603, the electronic device 100 generates a depth map of the image. At operation 605, the electronic device 100 performs over-segmentation on the image according to the depth map, to generate segmentation information of at least one object in the image.

At operation 607, the electronic device 100 determines at least one segment to be noise. For example, a segment which has a size lower than a threshold may be determined to be noise. Alternatively, a point cloud may be voxelated, and a voxel with fewer than a threshold number of votes and/or neighbors may be determined to be noise.

At operation 609, the electronic device 100 deletes the segment determined to be noise.

Figure 7:
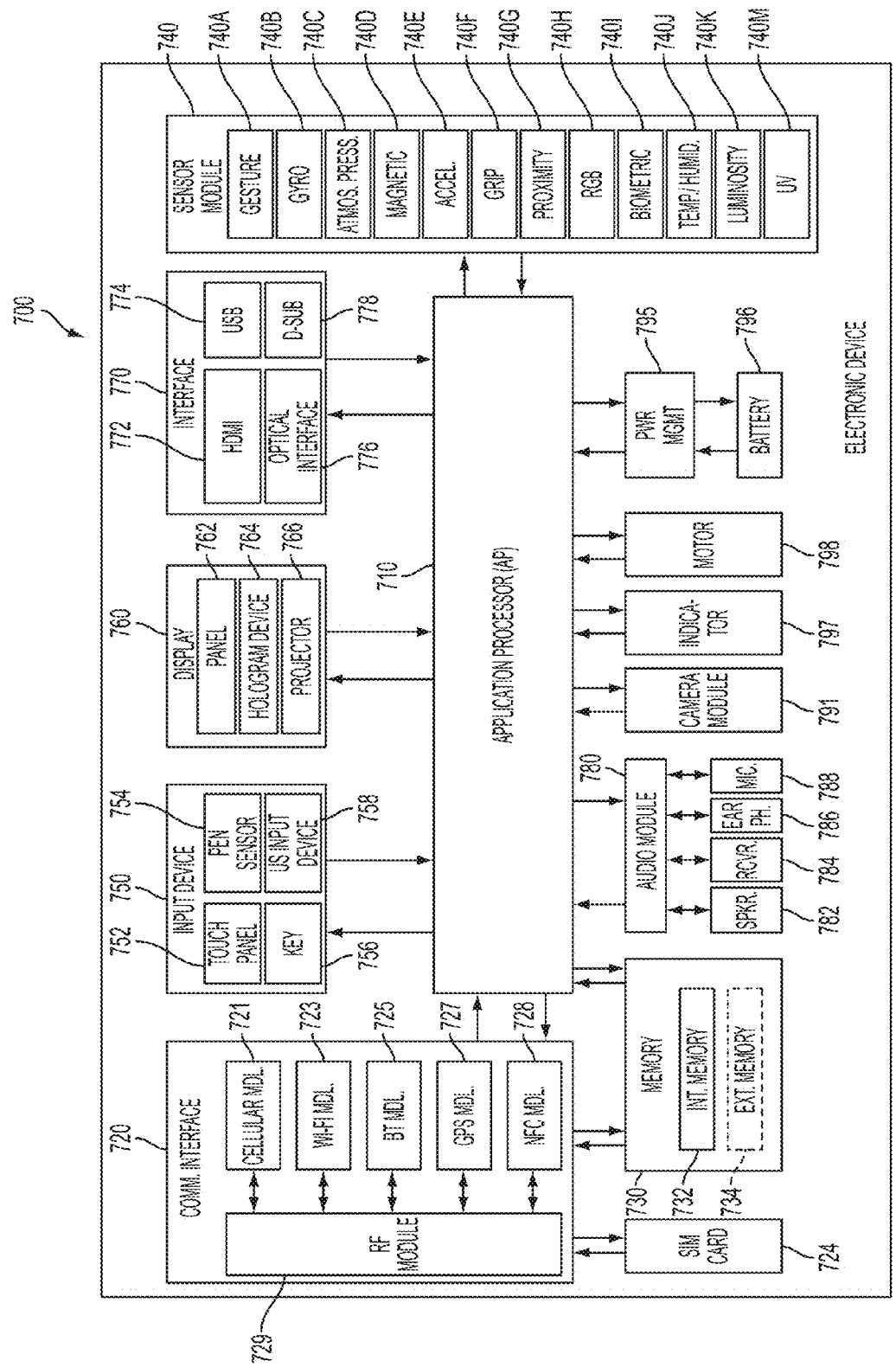
FIG. 7 illustrates a block diagram of an electronic device according to various embodiments of the present disclosure.

FIG. 7 illustrates a block diagram of an electronic device according to various embodiments of the present disclosure.

Figure 8:
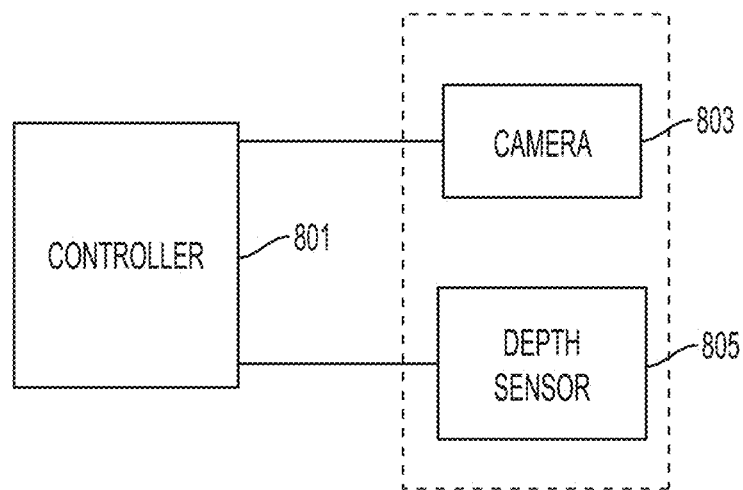
FIG. 8 illustrates a block diagram of an electronic device according to an embodiment of the present disclosure.

Referring to FIG. 7, electronic device 700 may be, for example, a part or the entire electronic device 100 or the electronic device of FIG. 8. The electronic device 700 may include one or more Application Processors (AP) 710, a communication interface 720, a Subscriber Identification Module (SIM) card 724, a memory 730, a sensor module 740, an input module 750, a display module 760, an interface 770, an audio module 780, a camera module 791, a power management module 795, a battery 796, an indicator 797, a motor 798, and/or the like.

The AP 710 (e.g., the controller 103 or controller 801 of FIG. 8) may control one or more hardware or software components that are connected to AP 710, perform processing or computation of data (including multimedia data), and/or the like. As an example, the AP 710 may be implemented as a System-on-Chip (SoC). The AP 710 may include a Graphics Processing Unit (GPU) (not shown).

The communication interface 720 (e.g., the wireless communication unit 102) may transmit and receive data in communications between the electronic device 700 and other electronic devices (e.g., the electronic device 100, a server, and/or the like). As an example, the communication interface 720 may include one or more of a cellular module 721, a Wi-Fi module 723, a Bluetooth module 725, a Global Positioning System (GPS) module 727, a Near Field Communication (NFC) module 728, a Radio Frequency (RF) module 729, and/or the like.

The cellular module 721 may provide services such as, for example, a voice call, a video call, a Short Messaging Service (SMS), internet service, and/or the like, via a communication network (e.g., Long Tem Evolution (LTE), LTE-Advanced (LTE-A), Code Division Multiple Access (CDMA), Wideband CDMA (WCDMA), Universal Mobile Telecommunications System (UMTS), Wireless Broadband (WiBro), Global System for Mobile communications (GSM), and/or the like). As an example, the cellular module 721 may differentiate and authorize electronic devices within a communication network using a Subscriber Identification Module (SIM) card (e.g., the SIM card 724). According to various embodiments of the present disclosure, the cellular module 721 may perform at least a part of the functionalities of the AP 710. For example, the cellular module 721 may perform at least a part of multimedia control functionality.

According to various embodiments of the present disclosure, the communication interface 720 and/or the cellular module 721 may include a Communication Processor (CP). As an example, the cellular module 721 may be implemented as SoC.

Although FIG. 7 illustrates components such as the cellular module 721 (e.g., CP), the memory 730, the power management module 795 as components that are separate from the AP 710, according to various embodiments of the present disclosure, the AP 710 may include, or be integrated with, one or more of the foregoing components (e.g., the cellular module 721).

According to various embodiments of the present disclosure, the AP 710, the cellular module 721 (e.g., CP), and/or the like, may process instructions or data received from at least one of non-volatile memory or other components by loading in volatile memory. The AP 710, the cellular module 721, the communication interface 720, and/or the like, may store at non-volatile memory at least one of data that is received from at least one of other components or data that is generated by at least one of the other components.

Each of the Wi-Fi module 723, the Bluetooth module 725, the GPS module 727, the NFC module 728, and/or the like may, for example, include one or more processors that may process data received or transmitted by the respective modules. Although FIG. 7 illustrates the cellular module 721, the Wi-Fi module 723, the Bluetooth module 725, the GPS module 727, and the NFC module 728 as separate blocks, according to various embodiments of the present disclosure, any combination (e.g., two or more) of the cellular module 721, the Wi-Fi module 723, the Bluetooth module 725, the GPS module 727, the NFC module 728, and/or the like may be included in an Integrated Chip (IC) or an IC package. For example, at least some of the processors corresponding to the respective the cellular module 721, the Wi-Fi module 723, the Bluetooth module 725, the GPS module 727, the NFC module 728, and/or the like, may be implemented as a single SoC. For example, a CP corresponding to the cellular module 721 and a Wi-Fi processor corresponding to Wi-Fi module 723 may be implemented as a single SoC.

The RF module 729 may, for example, transmit and receive RF signals. Although not shown, the RF module 729 may include a transceiver, a Power Amp Module (PAM), a frequency filter, a Low Noise Amplifier (LNA), and/or the like. The RF module 729 may include one or more components for transmitting and receiving Electro-Magnetic (EM) waves (e.g., in free space or the like) such as, for example, conductors or conductive wires. Although FIG. 7 illustrates that the cellular module 721, the Wi-Fi module 723, the Bluetooth module 725, the GPS module 727, and the NFC module 728 are sharing one RF module 729, according to various embodiments of the present disclosure, at least one of the cellular module 721, the Wi-Fi module 723, the Bluetooth module 725, the GPS module 727, the NFC module 728, and/or the like may transmit and receive RF signals via a separate RF module.

The SIM card 724 may be a card implementing a SIM, and may be configured to be inserted into a slot disposed at a specified location of the electronic device 700. The SIM card 724 may include a unique identifier (e.g., Integrated Circuit Card IDentifier (ICCID)) subscriber information (e.g., International Mobile Subscriber Identity (IMSI)), and/or the like.

The memory 730 (e.g., the memory 105) may include an internal memory 732, an external memory 734, or a combination thereof.

According to various embodiments of the present disclosure, the internal memory 732 may be, for example, at least one of volatile memory (e.g., Dynamic Random Access Memory (DRAM), Static Random Access Memory (SRAM) or Synchronous Dynamic Random Access Memory (SDRAM)), non-volatile memory (e.g., One Time Programmable Read Only Memory (OTPROM), Programmable Read Only Memory (PROM), Erasable and Programmable Read Only Memory (EPROM), Electrically Erasable and Programmable Read Only Memory (EEPROM), mask Read Only Memory (ROM), flash ROM, NAND flash memory, NOR flash memory), and/or the like.

According to various embodiments of the present disclosure, the internal memory 732 may be a Solid State Drive (SSD). As an example, the external memory 734 may be a flash drive (e.g., Compact Flash (CF) drive), Secure Digital (SD), micro Secure Digital (micro-SD), mini Secure Digital (mini-SD), extreme Digital (xD), Memory Stick, and/or the like). The external memory 734 may be operatively coupled to electronic device 700 via various interfaces. According to various embodiments of the present disclosure, the electronic device 700 may include recording devices (or recording media) such as, for example, Hard Disk Drives (HDD), and/or the like.

The sensor module 740 may measure physical/environmental properties detect operational states associated with electronic device 700, and/or the like, and convert the measured and/or detected information into signals such as, for example, electric signals or electromagnetic signals. As an example, the sensor module 740 may include at least one of a gesture sensor 740A, a gyro sensor 740B, an atmospheric pressure sensor 740C, a magnetic sensor 740D, an accelerometer 740E, a grip sensor 740F, a proximity sensor 740G, a Red Green Blue (RGB) sensor 740H, a biometric sensor 740I, a temperature/humidity sensor 740J, a luminosity sensor 740K, a Ultra Violet (UV) sensor 740M, and/or the like. The sensor module 740 may detect the operation state of the electronic device 700 and/or measure physical properties, and convert the detected or measured information into electrical signals. Additionally or alternatively, the sensor module 740 may also include, for example, an electrical-nose sensor (not shown), an electromyography (EMG) sensor (not shown), an electroencephalogram (EEG) sensor (not shown), an infrared (IR) sensor (not shown), an eye-scanning sensor (e.g., iris sensor) (not shown), a fingerprint sensor, and/or the like. The sensor module 740 may also include control circuitry for controlling one or more sensors included therein. The electronic device 700 may include the depth sensor 107 or depth sensor 805 of FIG. 8 with or separate from sensor module 740.

The input module 750 (e.g., the input unit 104) may include a touch panel 752, a (digital) pen sensor 754, a key 756, an ultrasonic input device 758, and/or the like.

As an example, the touch panel 752 may detect touch input using capacitive, resistive, infrared, ultrasonic methods, and/or the like. The touch panel 752 may also include a touch panel controller (not shown). As an example, a capacitive-type touch panel may detect proximity inputs (e.g. hovering input) in addition to, or as an alternative to, physical touch inputs. The touch panel 752 may also include a tactile layer. According to various embodiments of the present disclosure, the touch panel 752 may provide haptic feedback to the user using the tactile layer.

As an example, the (digital) pen sensor 754 may be implemented using methods identical to or similar to receiving a touch input from a user, or using a separate detection sheet (e.g., a digitizer).

As an example, the key 756 may be a keypad, a touch key, and/or the like.

As an example, the ultrasonic input device 758 may be a device configured to identify data by detecting, using a microphone (e.g., a microphone 788), ultrasonic signals generated by a device capable of generating the ultrasonic signal. The ultrasonic input device 758 may detect data wirelessly.

According to various embodiments of the present disclosure, the electronic device 700 may receive user input from an external device (e.g., a network, computer or server) connected to the electronic device 700 using the communication interface 720.

The display module 760 (e.g., the display device 101) may include a panel 762, a hologram device 764, a projector 766, and/or the like. As an example, the panel 762 may be, for example, a Liquid-Crystal Display (LCD), an Active-Matrix Organic Light-Emitting Diode (AM-OLED) display, and/or the like. As an example, the panel 762 may be configured to be flexible, transparent, and/or wearable. The panel 762 and the touch panel 752 may be implemented as a single module. The hologram device 764 may provide a three-dimensional image. For example, the hologram device 764 may utilize the interference of light waves to provide a three-dimensional image in empty space. The projector 766 may provide image by projecting light on a surface (e.g., a wall, a screen, and/or the like). As an example, the surface may be positioned internal or external to electronic device 700. According to various embodiments of the present disclosure, the display module 760 may also include a control circuitry for controlling the panel 762, the hologram device 764, the projector 766, and/or the like.

The interface 770 may include, for example, one or more interfaces for a High-Definition Multimedia Interface (HDMI) 772, a Universal Serial Bus (USB) 774, an optical interface 776, or a D-subminiature (D-sub) 778, and/or the like. As an example, the interface 770 may be part of the communication interface 720. Additionally or alternatively, the interface 770 may include, for example, one or more interfaces for Mobile High-definition Link (MHL), Secure Digital (SD)/MultiMedia Card (MMC), Infrared Data Association (IrDA), and/or the like.

The audio module 780 may encode/decode sound into electrical signal, and vice versa. According to various embodiments of the present disclosure, at least a portion of audio module 780 may be part of the interface 770. As an example, the audio module 780 may encode/decode voice information that is input into, or output from, the speaker 782, the receiver 784, the earphone 786, the microphone 788, and/or the like.

The camera module 791 (e.g., the camera 108 or camera 803 of FIG. 8) may capture still images and/or video. According to various embodiments of the present disclosure, the camera module 791 may include one or more image sensors (e.g., front sensor module, rear sensor module, and/or the like) (not shown), an Image Signal Processor (ISP) (not shown), or a flash (e.g., Light-Emitting Diode (flash LED), xenon lamp, and/or the like) (not shown).

The power management module 795 may manage electrical power of the electronic device 700. Although not shown, the power management module 795 may include, for example, a Power Management Integrated Circuit (PMIC), a charger Integrated Circuit (charger IC), a battery gauge, a fuel gauge, and/or the like.

As an example, the PMIC may be disposed in an integrated circuit or an SoC semiconductor. The charging method for the electronic device 700 may include wired or wireless charging. The charger IC may charge a battery and may prevent excessive voltage or excessive current from a charger from entering the electronic device 700, and/or the like. According to various embodiments of the present disclosure, the charger IC may include at least one of a wired charger IC or a wireless charger IC. As an example, the wireless charger IC may be a magnetic resonance type, a magnetic induction type, an electromagnetic wave type, and/or the like. As an example, the wireless charger IC may include circuits such as a coil loop, a resonance circuit, a rectifier, and/or the like.

As an example, the battery gauge may measure a charge level, a voltage while charging, a temperature of battery 796, and/or the like.

As an example, the battery 796 may supply power to the electronic device 700. As an example, the battery 796 may be a rechargeable battery, a solar battery, and/or the like.

The indicator 797 may indicate one or more states (e.g., boot status, message status, charge status, and/or the like) of the electronic device 700 or a portion thereof (e.g., the AP 710). Motor 798 may convert an electrical signal into a mechanical vibration.

Although not shown, the electronic device 700 may include one or more devices for supporting mobile television (mobile TV) (e.g., a GPU), and/or the like. The devices for supporting mobile TV may support processing of media data compliant with, for example, Digital Multimedia Broadcasting (DMB), Digital Video Broadcasting (DVB), media flow, and/or the like.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

FIG. 8 illustrates a block diagram of an electronic device according to an embodiment of the present disclosure.

Referring now to FIG. 8, an electronic device is shown comprising a controller 801, a camera 803, and a depth sensor 805. The electronic device may be, for example, a part or the entire electronic device 100 or electronic device 700. The controller 801 (e.g., the controller 103 or the AP 710) is configured to control operations of the electronic device. The camera 803 (e.g., the camera 108 or the camera module 791) is configured to capture an image, as described above. The depth sensor 805 (e.g., the depth sensor 107 or a sensor included with or separate from sensor module 740) is configured to determine depth information corresponding to at least one object in the image captured by the camera 803. The depth sensor 805 and the camera 803 may be combined; for example, the depth sensor 805 and the camera 803 may include a stereoscopic camera. The present disclosure is not limited thereto, however.

More particularly, the controller 801 is configured to generate a depth map of the image captured by the camera 803, according to the depth information determined by the depth sensor 805. The controller 801 performs over-segmentation of the depth map to generate segmentation information corresponding to the image. The controller 801 then determines at least one segment to be noise according to the over-segmentation information as described above, and deletes the segment determined to be noise.

While the disclosure has been shown and described with reference to various embodiments thereof, it will be understood by those skilled in the art that various changes in form and details may be made therein without departing from the spirit and scope of the disclosure as defined by the appended claims and their equivalents. Various embodiments of the present disclosure are described as examples only and are noted intended to limit the scope of the present disclosure. Accordingly, the scope of the present disclosure should be understood as to include any and all modifications that may be made without departing from the technical spirit of the present disclosure.

What is claimed is:

1. A image noise reduction method comprising:
   capturing an image, including capturing depth information of at least one object in the image;
   generating a depth map of the image including the depth information of the at least one object;
   generating segmentation information corresponding to the image by over-segmenting the depth map;
   determining at least one segment to be noise based on the segmentation information; and
   deleting the at least one segment determined to be noise.

2. The method of claim 1, wherein the at least one segment determined to be noise comprises a segment having a size under a threshold.

3. The method of claim 1, further comprising:
   virtually rotating a camera viewpoint;
   repeating the over-segmenting of the depth map;
   determining another segment to be noise; and
   deleting the other segment determined to be noise, according to the rotated viewpoint,
   wherein the captured image is captured from a different viewpoint than the rotated viewpoint.

4. The method of claim 1, further comprising:
   voxelizing a point cloud; and
   deleting at least one voxel determined to be noise.

5. The method of claim 4, wherein the voxel determined to be noise comprises a voxel with fewer than a threshold number of votes.

6. The method of claim 4, wherein the voxel determined to be noise comprises a voxel with fewer than a threshold number of neighbors.

7. The method of claim 1, wherein the over-segmenting is based on a Connected Components (CC) algorithm.

8. The method of claim 7, wherein the CC algorithm comprises a depth smoothness threshold of at least a predetermined size.

9. The method of claim 8, wherein the at least one segment determined to be noise comprises a segment having a size under the depth smoothness threshold.

10. An apparatus for image noise reduction, the apparatus comprising:
    a camera configured to capture an image;
    a depth sensor configured to determine depth information of at least one object in the image; and
    at least one processor configured to:
        generate a depth map of the image according to the depth information of the at least one object;
        generate segmentation information corresponding to the image, by over-segmenting the depth map;
        determine at least one segment to be noise based on the segmentation information; and
        delete the at least one segment determined to be noise.

11. The apparatus of claim 10, wherein the at least one segment determined to be noise comprises a segment having a size under a threshold.

12. The apparatus of claim 10, wherein the at least one processor is further configured to:
    virtually rotate a camera viewpoint;
    repeat the over-segmenting of the depth map;
    determine another segment to be noise; and
    delete the other segment determined to be noise, according to the rotated viewpoint,
    wherein the captured image is captured from a different viewpoint than the rotated viewpoint.

13. The apparatus of claim 10, wherein the at least one processor is further configured to:
    voxelize a point cloud; and
    delete at least one voxel determined to be noise.

14. The apparatus of claim 13, wherein the voxel determined to be noise comprises a voxel with fewer than a threshold number of votes.

15. The apparatus of claim 13, wherein the voxel determined to be noise comprises a voxel with fewer than a threshold number of neighbors.

16. The apparatus of claim 10, wherein the over-segmenting is based on a Connected Components (CC) algorithm.

17. The apparatus of claim 16, wherein the CC algorithm comprises a depth smoothness threshold of at least a predetermined size.

18. The apparatus of claim 17, wherein the at least one segment determined to be noise comprises a segment having a size under the depth smoothness threshold.

* * * * *